US010585679B2

(12) United States Patent
Bajic et al.

(10) Patent No.: US 10,585,679 B2
(45) Date of Patent: \*Mar. 10, 2020

(54) PROCESSING CORE WITH OPERATION SUPPRESSION BASED ON CONTRIBUTION ESTIMATE

(71) Applicant: Tenstorrent Inc., Toronto (CA)

(72) Inventors: Ljubisa Bajic, Toronto (CA); Milos Trajkovic, Toronto (CA); Ivan Hamer, Toronto (CA); Syed Gilani, Markham (CA)

(73) Assignee: Tenstorrent Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,749

(22) Filed: May 20, 2019

(65) Prior Publication Data

US 2019/0272183 A1 Sep. 5, 2019

Related U.S. Application Data

(63) Continuation of application No. 15/975,930, filed on May 10, 2018, now Pat. No. 10,318,317.

(Continued)

(51) Int. Cl.
*G06F 9/448* (2018.01)
*G06F 7/523* (2006.01)
(Continued)

(52) U.S. Cl.
CPC .............. *G06F 9/4494* (2018.02); *G06F 7/50* (2013.01); *G06F 7/523* (2013.01); *G06F 15/76* (2013.01); *G06N 20/00* (2019.01)

(58) Field of Classification Search
CPC .......... G06F 9/4494; G06F 7/50; G06F 7/523; G06F 15/18; G06F 15/76
(Continued)

(56) References Cited

U.S. PATENT DOCUMENTS 5,053,987 A 10/1991 Genusov
6,366,943 B1 4/2002 Clinton
(Continued)

FOREIGN PATENT DOCUMENTS

CN 107153522 A 9/2017
EP 1313325 A2 5/2003
(Continued)

OTHER PUBLICATIONS

E. Bengio, et al., Conditional Computation in Neural Networks for Faster Models, ICLR 2016.
(Continued)

*Primary Examiner* — Tan V Mai
(74) *Attorney, Agent, or Firm* — Daylight Law, P.C.

(57) ABSTRACT

Processing cores with the ability to suppress operations based on a contribution estimate for those operation for purposes of increasing the overall performance of the core are disclosed. Associated methods that can be conducted by such processing cores are also disclosed. One such method includes generating a reference value for a composite computation. A complete execution of the composite computation generates a precise output and requires execution of a set of component computations. The method also includes generating a component computation approximation. The method also includes evaluating the component computation approximation with the reference value. The method also includes executing a partial execution of the composite computation using the component computation approximation to produce an estimated output. The method also includes suppressing the component computation, while executing the partial execution, based on the evaluation of the component computation approximation with the reference value.

25 Claims, 12 Drawing Sheets

Related U.S. Application Data

(60) Provisional application No. 62/505,775, filed on May 12, 2017.

(51) Int. Cl.
*G06F 7/50* (2006.01)
*G06N 20/00* (2019.01)
*G06F 15/76* (2006.01)

(58) Field of Classification Search
USPC ........................................................ 708/207
See application file for complete search history.

(56) References Cited

U.S. PATENT DOCUMENTS

| | | |
|---|---|---|
| 6,397,238 B2 | 5/2002 | Oberman |
| 7,467,177 B2 | 12/2008 | Simkins |
| 9,633,306 B2 | 4/2017 | Liu |
| 2003/0055860 A1 | 3/2003 | Giacalone |
| 2003/0055861 A1 | 3/2003 | Lai |
| 2003/0095603 A1 | 5/2003 | Lan |
| 2006/0230093 A1 | 10/2006 | New |
| 2006/0230201 A1 | 10/2006 | Fromherz et al. |

FOREIGN PATENT DOCUMENTS

| | | |
|---|---|---|
| JP | 3046069 B2 | 5/2000 |
| SU | 1619254 A1 | 1/1991 |

OTHER PUBLICATIONS

J. Zhu, et al., LRADNN: High-throughput and energy-efficient Deep Neural Network Accelerator using Low Rank Approximation, Design Automation Conference, 2016 21st Asia and South Pacific, Jan. 25-28, 2016.

O. Nomura, et al., A Convolutional Neural Network VLSI Architecture Using Sorting Model for Reducing Multiply-and-Accumulate Operations, 2005 International Conference on Natural Computation, Advances in Natural Computation, pp. 1006-1014, 2005.

O. Nomura, et al., A Convolutional Neural Network VLSI Architecture Using Thresholding and Weight Decomposition, 2004 International Conference on Knowledge-Based and Intelligent Information and Engineering Systems, pp. 995-1001, 2004.

Paul E. Utgoff. Perceptron trees: A case study in hybrid concept representations. In Proceedings of the 7th National Conference on Artificial Intelligence. St. Paul, MN, Aug. 21-26, pp. 601-606, 1988.

PCT International Search Report dated Sep. 4, 2018 from International Application No. PCT/IB2018/053301 filed Sep. 4, 2018, 7 pages.

Y. Huan, et al., A Multiplication Reduction Technique with Near-Zero Approximation for Embedded Learning in IoT Devices, 29th IEEE International System-on-Chip Conference, pp. 102-107, Sep. 2016.

International Preliminary Report on Patentability dated Nov. 21, 2019 from International Application No. PCT/IB2018/053301 dated May 11, 2018, 5 pages.

300

[Y]

[X]  5.1  4.3  2.4 . . .

$\begin{bmatrix} 1 \\ 7 \\ 5 \\ . \\ . \\ . \end{bmatrix}$

301

1.) 5 = 5 x 1
2.) 28 = 7 x 4
3.) 10 = 5 x 2

302

$14.\overline{3}$

304 ↓

Suppress

Execute

Approx

Reference =
Computation  - Tolerance

303

?

600

[X] 5.1 4.3 2.4 . . .

[Y]
1
7
5
.
.
.

601 – Gen. Component Approx.

1.) 5 x 1
2.) 7 x 4
3.) 5 x 2

606 – Gen. Reference

1.) 5.1 x 1
2.) 7 x 4.3 + 5.1
3.) 10 + 35.2

$$[X] = (sign_x) * 2^{(Exponent_x)} * (mantissa_x) \leftarrow 701$$

$$[Y] = (sign_y) * 2^{(Exponent_y)} * (mantissa_y) \leftarrow 702$$

$$[X] * [Y] \approx Approx([X],[Y]) = $$
$$(sign_y)*(sign_x)*((Exponent_x)+(Exponent_y)) * M$$

703

900

1000

1100

1200

PROCESSING CORE WITH OPERATION SUPPRESSION BASED ON CONTRIBUTION ESTIMATE

CROSS-REFERENCE TO RELATED APPLICATIONS

This application is a continuation of U.S. patent application Ser. No. 15/975,930, filed May 10, 2018, which claims the benefit of U.S. Provisional Patent Application No. 62/505,775, filed May 12, 2017, both of which are incorporated by reference herein in their entirety for all purposes.

BACKGROUND

If you fold a piece of paper in half a mere fifty times, the resulting stack of paper would be as thick as the distance from the Earth to the Sun. While each fold is a simple operation that increases the thickness of the stack by two, the aggregate task is not at all simple. Likewise, many computations conducted by modern computing systems are composite computations that are composed of multiple simple component parts. Each component calculation may be trivial to execute, but the number of components may be astronomically large, resulting in a composite computation that is anything but trivial. Indeed, basic computations that have been handled with ease since the dawn of computing can, taken in the aggregate, result in a composite computation that is effectively intractable for a given application.

The field of machine learning algorithms, and particularly the field of artificial neural networks (ANNs) is held back in large part due to the computational complexity involved with implementing the traditional algorithms used to instantiate an ANN. Assuming the execution of a given ANN used to recognize a word from a sound file takes 10 billion computations, even if each of those component computations could be executed in a microsecond, the composite task would still take over 150 hours to execute. Having speech recognition technology operating at that speed is essentially the same as not having speech recognition technology at all. The reason machine intelligence applications are so resource hungry is that the data structures being operated on are generally very large, and the number of discrete primitive computations that must be executed on each of the data structures are likewise immense. A traditional ANN takes in an input vector, conducts calculations using the input vector and a set of weight vectors, and produces an output vector. Each weight vector in the set of weight vectors is often referred to as a layer of the network, and the output of each layer serves as the input to the next layer. In a traditional network, the layers are fully connected, which requires every element of the input vector to be involved in a calculation with every element of the weight vector. Therefore, the number of calculations involved increases with a power law relationship to the size of each layer.

The latest surge of interest in machine learning algorithms owes its strength most acutely to improvements in the hardware and software used to conduct the composite calculations for the execution of the ANN as opposed to the development of new algorithms. The improvements in hardware and software take various forms. For example, graphical processing units traditionally used to process the vectors used to render polygons for computer graphics have been repurposed in an efficient manner to manipulate the data elements used in machine intelligence processes. As another example, certain classes of hardware have been designed from the ground-up to implement machine intelligence algorithms by using specialized processing elements such as systolic arrays. Further advances have centered around using collections of transistors and memory elements to mimic, directly in hardware, the behavior of neurons in a traditional ANN. There is no question that the field of machine intelligence has benefited greatly from these improvements. However, despite the intense interest directed to these approaches, machine intelligence systems still represent one of the most computationally and energy intensive computing applications of the modern age, and present a field that is ripe for further advances.

SUMMARY

Processing cores with the ability to suppress operations based on a contribution estimate for those operation for purposes of increasing the overall performance of the core are disclosed. Associated methods that can be conducted by such processing cores are also disclosed. One such method includes generating a reference value for a composite computation. A complete execution of the composite computation generates a precise output and requires execution of a set of component computations. The method also includes generating a component computation approximation for a component computation in the set of component computations. The method also includes evaluating the component computation approximation with the reference value. The method also includes executing a partial execution of the composite computation to produce an estimated output. The partial execution of the composite computation uses the component computation approximation. The method also includes suppressing the component computation, while executing the partial execution, based on the evaluation of the component computation approximation with the reference value.

Another method that a processing core in accordance with this disclosure can conduct includes storing a reference value for a composite computation in a memory. A complete execution of the composite computation generates a precise output and requires execution of a set of component computations. The method also includes generating a component computation approximation for a component computation in the set of component computations. The method also includes evaluating the component computation approximation with the reference value. The method also includes executing a partial execution of the composite computation to produce an estimated output. The partial execution of the composite computation uses the component computation approximation. The method also includes suppressing the component computation, while executing the partial execution, based on the evaluation of the component computation approximation with the reference value.

Another method that a processing core in accordance with this disclosure can conduct includes storing at least one reference value for a composite computation. A complete execution of the composite computation includes a set of component computations. The method also includes generating a set of component computation approximations for the set of component computations. The method also includes executing a partial execution of the composite computation to produce an estimated output. The partial execution of the composite computation uses the component computation approximation. The method also includes alternatively suppressing and executing the component computations in the set of component computations, while executing the partial execution, based on the at least one reference value and the set of component computation approximations.

DETAILED DESCRIPTION

Certain composite computations can be approximated via the execution of a small subset of their component computations. This is problematic from a computational resource perspective because the less critical component computations tend to consume the same amount of time and power but do not generate nearly the same amount of value as the key subset. To conserve resources, the less critical component computations could be pruned out of the composite computation to allow for a partial execution of the composite computation. Ideally, the partial execution would produce a result that was approximately equivalent to the result produced by a full execution of the composite computation. If the pruning of the composite computation was conducted properly, the partial execution would have adequate fidelity to the full execution while consuming less computational resources.

Figure 1:
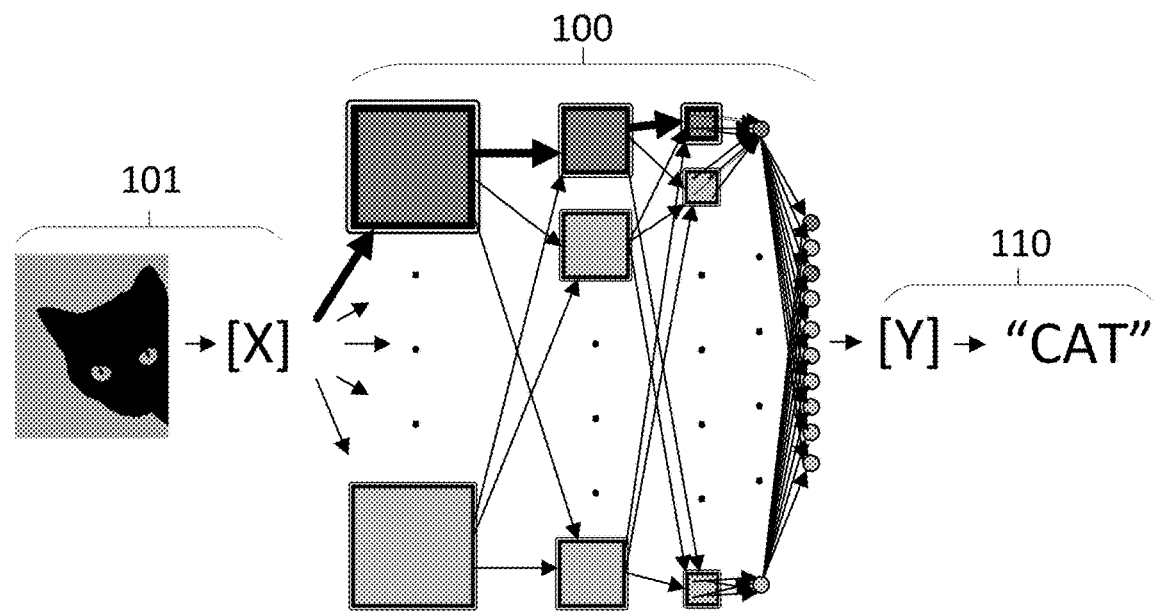
FIG. 1 illustrates a directed graph instantiation of an artificial neural network generating inferences based on two different inputs in accordance with the related art.
Figure 1:
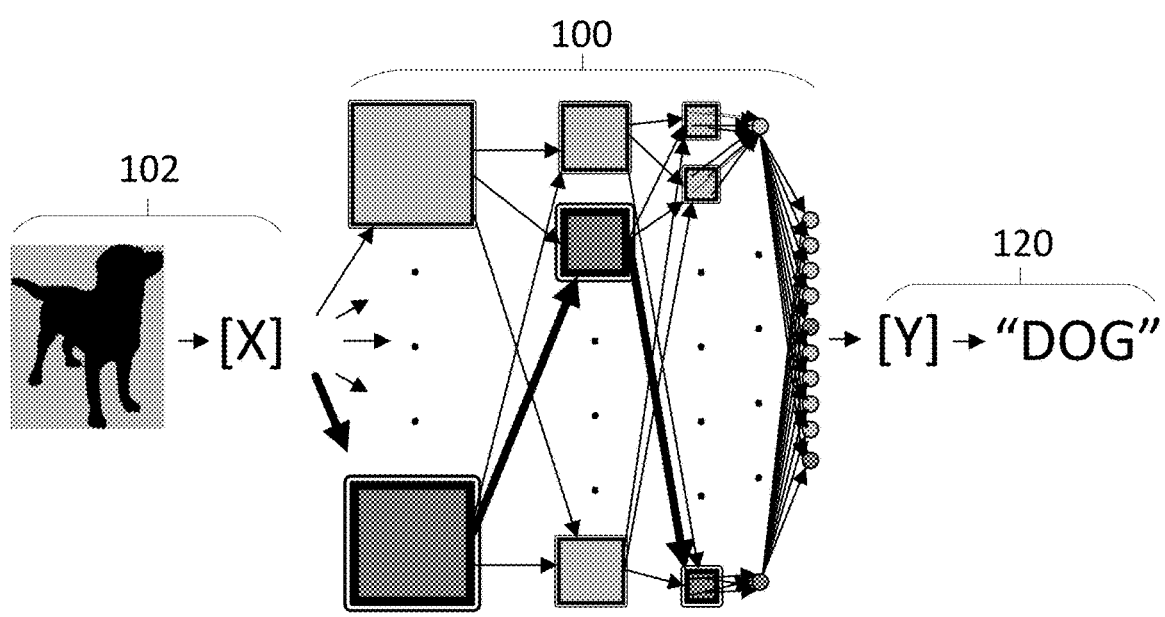

The execution of an ANN is an example of the class of problems described in the prior paragraph. The execution of an ANN for purposes of generating an inference from an input generally involves a large number of component computations that do not significantly contribute to the value expressed by the generated inference. This is because ANNs are generally over-parameterized for any given inference. They are trained to work with many different potential inputs, but only process one input at a time. For example, an ANN may be able to recognize multiple subjects in an input image, but only a small portion of the ANN may respond in a meaningful way to any one subject. In the example of FIG. 1, a single ANN 100 is provided with two different inputs. Input 101 is an input tensor that encodes an image of a cat. After a full execution, ANN 100 produces an inference 110 from input 101 in the form of the text string "CAT." Input 102 is an input tensor that encodes an image of a dog. After a full execution, ANN 100 produces an inference 120 from input 102 in the form of the text string "DOG."

Different portions of the ANN may acutely contribute to the output when the subject is a dog, and not contribute at all when the subject is a cat. As illustrated, different paths through ANN 100 are emphasized for each execution, indicating the portions of the ANN that are most active during each inference. Each of the nodes in the illustrated directed graphs of the ANN involve an enormous number of calculations including sum-of-products calculations for both matrix multiplications in the fully connected layers of the ANN and convolutions between filters and prior layers in the convolutional layers of the ANN. In the case of inference 110, all of the calculations involved with the lower portion of the directed graph were essentially wasted as they did not contribute in any meaningful way to the generated value. However, the lower portion of the directed graph was essential for the case of generating inference 120. The computation of the outputs of one layer of the ANN, or sub-sections of one layer of the ANN, can be considered a component computation to a composite computation consisting of the overall execution of the ANN.

Although FIG. 1 illustrates the need for optimization at the graph-level of the ANN, the same principle scales with the overall system. Individual sum-of-products computations, convolutions of a filter or set of filters with a set of input data, and multi-product computations such as matrix multiplications are all examples of composite computations that are amenable to optimization because they consist essentially of component computations that can alternatively be suppressed or fully executed based on an estimate of their contribution to a higher-level computation in accordance with approaches disclosed herein. In the case of ANNs, the component computations can be pruned while not overly effecting the outcome of the higher-level computation because many component computations in a single sum-of-products calculation can be negligible during the execution of an ANN, even when the output of that sum-of-products calculation is critical to the execution of the ANN. In other words, the individual multiplications in a sum-of-products computation are component computations that can be pruned while maintaining fidelity to the output of the composite sum-of-products calculation.

As described in more detail below, operations can be "suppressed," as that term is used herein, using several approaches including entirely dropping a computation from being executed and not replacing it with anything, performing a less computationally intensive operation in place of the computation, or obtaining a replacement value from memory for the computation. In certain approaches, the replacement value can also be a value which was used to estimate the contribution of the component computation. These approaches are particularly beneficial in that a single quanta of processing resources is consumed to both provide a value for determining if a computation should be pruned, and to provide a rough estimate of what the computation would have produced if it had been executed with high fidelity which can be used as a replacement for the suppressed computation.

As illustrated by FIG. 1, pruning out composite computations is difficult from an ex ante perspective because it is not immediately clear which component computations are low value and which are important. If computations in the bottom portion of the graph were pruned out, the correct inference would be produced in response to input 101, but might not be produced in response to input 102. However, the computational resources consumed by a composite computation can be reduced by obtaining an estimate of the real or expected contribution of each component computation to the output of the composite computation, and using that estimate to prune out component computations during a subsequent, or simultaneous, partial execution of the composite computation. Here, the term "partial execution" is applied in contrast to a complete execution involving the execution of the full set of component computations that define the composite computation (i.e., without suppressing a subset of component computations).

In approaches disclosed herein, the overhead associated with obtaining the estimate discussed in the prior paragraph is generally less than the computational resources preserved by using the obtained information to partially execute the composite computation. Such approaches include those where the composite computations involve a large number of component parts and the relative contribution of each component part to the overall output of the composite computation is widely variant. Generally, composite computations conducted during the execution of an ANN for purposes of obtaining an inference therefrom are examples of this class of problems.

The execution of a composite computation, which involves the execution of a set of component computations, can be simplified by obtaining an estimate of the contribution of those component computations to a complete execution of the composite computation, and suppressing the component computations during a partial execution of the composition computation. The partial execution will generate an estimated output which may not be equivalent to the precise output that would have been generated by a complete execution of the composite computation. However, if the component computations are suppressed in accordance with certain approaches disclosed herein, the decrease in computational resources consumed attributable to the partial execution will outweigh the decrease in accuracy. When applied to the field of composite computations used to generate the output of a sparse ANN, the savings in computational resources can be considerable and the decrease in precision may be negligible.

The outlined approach can include a system which is able to determine which component computations can be suppressed while still preserving adequate fidelity to the complete execution. In some approaches, determining which component computations of a composite computation can be suppressed, if any, involves the generation of component computation approximations. The component computation approximations provide approximations of the output of a given computation or provide an estimate of its effect on the overall composite computation to which it is a part. The component computation approximation can be generated by the execution of a less precise computation than the component computation itself. For example, the approximation could be generated by a lower precision hardware element than the hardware element used to execute the component computation. An 8-bit multiplier could be used to generate an approximation for a 32-bit multiplication. As another example, the approximation could be generated by a set of logic gates that determines if any operands to the component computation are zero, one, negative one, or some other value that is highly influential to the output of the computation. In the case of a multiplication computation, detecting that one of the operands is zero provides a component computation approximation because it is known that the product of any number with zero is zero.

In some approaches, determining which computations can be suppressed also utilizes a reference value. The reference value can be evaluated along with the approximations to determine a contribution estimate for the component computation. The contribution estimate can be used to suppress individual component computations while preserving the fidelity of the partial execution to the complete execution. For example, if the approximation is less than the reference value, such that the impact of the computation is likely to be nominal, the associated component computation will be suppressed and not executed. As another example, if the approximation is equal to a reference value of zero, the associated component computation can be suppressed and not executed.

Figure 2:
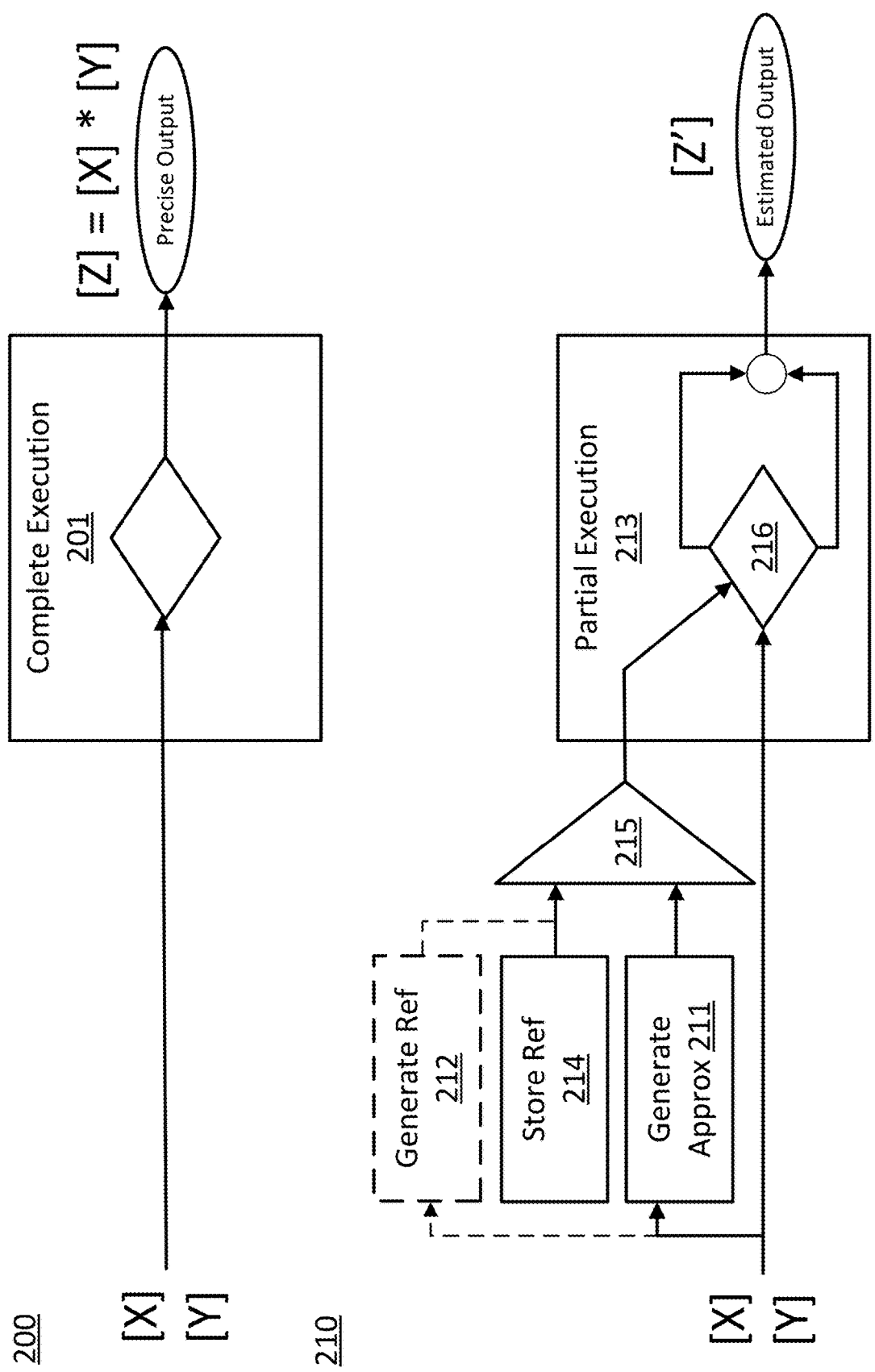
FIG. 2 illustrates two data flow diagrams for generating a precise output from a complete execution of a computation and an estimated output from a partial execution of the computation in accordance with approaches disclosed herein.

FIG. 2 provides an illustration of one class of approaches for reducing the computational complexity of a composite computation. FIG. 2 includes two data flow diagrams that illustrate the generation of an estimated output for a composite computation. In diagram 200, input tensors [X] and [Y] are subject to a complete execution of a computation 201. In the illustrated case, the complete execution 201 involves a dot product of the two tensors to produce an output tensor [Z]. For example, the two tensors could be one dimensional vectors and the complete execution could involve a sum-of-products composite computation. The tensors [X] and [Y] could be extremely large such that complete execution 201 was computationally intensive. In such a situation, data flow diagram 210 represents a more efficient process as it will generate an estimated output [Z'] which is approximately equivalent to output [Z], while consuming less computation resources in terms of both power, time, and hardware. The tensors [X] and [Y] could alternatively be multi-dimensional and the computation could be any tensor computation including a convolution, dot product, or cross product.

Data flow diagram 210 illustrates the steps of a set of computer-implemented methods. Each step of the diagram can be executed by a processing core in combination with a non-transitory computer-readable memory. Execution of data flow diagram 210 consumes a first amount of computational resources. Execution of data flow diagram 200 consumes a second amount of computational resources. The first amount is less than the second amount. Partial execution 213 could be executed using circuitry on the processing core such as multipliers, registers, adders, accumulators, and other logic, and can use that circuitry to generate output data from input data in response to received control inputs. Partial execution 213 can also involve a register file providing operands to a set of logic or math units. In certain approaches, partial execution 213 can also involve suppression logic that selectively provides operands from the register file to the set of logic or math units.

Data flow diagram includes step 211 in which a component computation approximation is generated for a component computation. The branch of steps 211, 212, 214, and 215 can be conducted in parallel or series with partial execution 213. The branch of steps can also be conducted by the suppression logic. The component computation approximation is an estimate of the output of the component computation and is generated using a less computationally intensive process than the actual execution of the component computation. The component computation approximation can provide an approximation of either the relative or absolute weight of one of the component computations that are involved in a given composite computation. For example, the approximation could provide information regarding the magnitude of the output of the component computation. The execution of step 211 can also involve the generation of a set of component computation approximations. Indeed, step 211 can involve generating an approximation for every component computation in the overall composite computation, a predetermined subset of component computations, or a subset of randomly sampled component computations. Step 211 can utilize one or both of input tensors [X] and [Y]. In some approaches, step 211 will involve a low-resolution execution of the component computation. For example, if the component computation was a 16-bit multiplication of two numbers, step 211 could involve an 8-bit multiplication of those numbers. In other approaches, step 211 will involve evaluating the operands to the component computation to determine if any of the operands are highly influential to the outcome of the operation. For example, step 211 could determine that one of the operands to a multiplication operation was a zero and the multiplication operation could be replaced by the delivery of a zero as the output of the multiplication.

Data flow diagram 210 also includes optional step 212 of generating a reference value. Step 212 is optional because the reference value could instead by preprogrammed or provided from a separate system, and stored in memory for later use, as in step 214. The value could be stored in RAM or programmed into the processing core in ROM memory. Step 212 can utilize one or both of input tensors [X] and [Y]. The reference value can be utilized to more accurately determine the priority that any given component computation should be given. For example, if tensors [X] and [Y] included values with widely varying orders of magnitude, the reference value could be set equal to the largest order of magnitude occupied by the values of the input tensors, and component computation approximations that were not at or above a fraction of that order of magnitude would be suppressed. The reference value used in evaluating a component computation approximation can also be derived from other component computation approximations in the same composite computation. The reference value can be a reference value for the entire composite computation or can be generated separately for subsets of the component computations. Additional approaches for generating the reference value are discussed below.

Data flow diagram 210 includes step 215 of evaluating the component computation approximation with the reference value. The step could be as simple as an equal-to, less-than, or greater-than analysis of the component computation approximation with the reference value, or a more complex analysis. For example, the step could determine if any of the operands to a multiplication were zero, or determine that one of the approximations was far lower than the average approximation generated for a set of component computations. The purpose of the comparison is to filter component computations based on their level of importance to the overall composite computation. As such, the comparison can output a binary value which sorts the components into computations that should be fully executed and ones that should be suppressed. Furthermore, the output of the comparison could determine an output value or substitute operation that should be executed in place of the suppressed computation. The evaluation in step 215 could also break the component computations into multiple levels of importance such as high, medium, and low. Once sorted into different levels, partial execution 213 can be conditioned based on the information obtained in step 215 to suppress or allow the component computations in different ways.

Partial execution 213 utilizes tensors [X] and [Y] as inputs and will generate estimated output [Z']. Estimated output [Z'] is not equivalent to output [Z]. However, the difference between the two values may be negligible, and generating estimated output [Z'] is less computationally intensive. Furthermore, unlike complete execution 201, partial execution 213 is also conditioned using the data generated in step 215. Partial execution 213 can involve step 216 of suppressing a component computation, based on the component computation approximation and the reference value. Step 216 can also involve alternatively suppressing and executing the component computations in a set of component computations based on the output of step 215.

Suppressing computations can be conducted in various ways. For example, suppressing the computation may involve striking the computation entirely from the composite computation, providing a value from memory in lieu of conducting the computation, conducting a lower resolution version of the computation, or otherwise replacing the component computation with a simplified operation. For example, in a sum-of-products computation in which specific operations are suppressed, a subset of the product computations might not be executed, and their outputs would thereby not be included in the summing computation. As another example, specific multiplication operations in a sum-of-products computation could be conducted using a lower precision multiplier or using lower precision operands. In another example, a preprogrammed average value could be pulled from memory to serve as the output of the suppressed computation. In another example, a zero value, value of one operand, or inverse value of one operand could be substituted for the output of the component computation. In another example, the component computation approximation could be substituted for the output of the component computation.

The reference value for the composite computation can be directly calculated from the operands, the component computation approximations, or both. However, the comparison of the reference value and component computation approximations can also involve a programmable tolerance that adjusts the degree by which component computation approximations are screened out and suppressed by adjusting the reference value. The programmable tolerance could be a fixed value or a fixed percentage. The programmable tolerance can be set to powers of two of the output of the direct calculation. For example, the tolerance could be used to generate a suppression signal for a component computation when the component computation approximation was half, one quarter, or one eighth of the directly calculated reference value. Such an approach would be amenable to implementation in hardware if the values for the output of the direct calculation and component computation approximation were encoded in binary. In a specific example, the direct calculation would determine a maximum value of the component computation approximations for a given composite computation and the reference value would be set to half of that value by the programmable tolerance.

Figure 3:
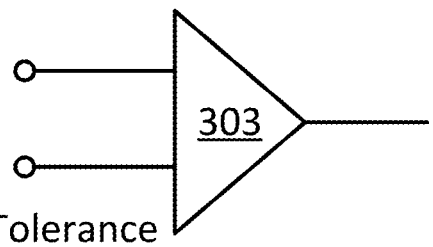
FIG. 3 illustrates the generation of a suppression command for a sum-of-products computation in accordance with approaches disclosed herein.

FIG. 3 provides an illustration 300 of the execution of step 215 in accordance with the preceding paragraph. The composite computation in this case is the dot product of two tensors [X] and [Y]. Three associated component computations approximations for that composite computation are illustrated in list 301, and are calculated using rounded values for the operands in tensor [X]. The values are generated by component computation approximations in accordance with this disclosure because an integer multiplication is less computationally intensive than a multiplication involving decimal numbers. In this example, the direct calculation output 302 is the average of the component computation approximations. Note that this situation is one in which the reference value will be common for a set of component computations and is determined after the set of approximations has been calculated.

Comparison 303 operates on a component computation approximation and the reference value to generate information used to suppress component computations in the partial execution. The information is provided in a vector 304. The information can be stored for later use or can be applied to suppress operations in real time. As illustrated, the first operation is slated to be suppressed because the approximation "5" is less than the average value "14.3" by a large amount, while the second operation is slated to be executed because the associated approximation "28" is greater than the average value "14.3". However, the third approximation is somewhat close to the reference and its entry in the vector is therefore marked with a question mark. The illustration is meant to signify the fact that, depending upon the programmable tolerance, the component computation could be marked for suppression or execution. For example, if the tolerance was set to one half of the direct calculation output, the associated computation would be executed during the partial execution because 10 is greater than half of 14.3.

The component computation approximations can be generated in numerous ways. As mentioned previously, the approximations will generally be generated by lower fidelity computations. The relative term "lower" is applied because the exact nature of the lower fidelity computation will depend on the component computation itself. For example, if the component computation is a multiplication computation between two 16-bit integers, the component computation approximation could involve the multiplication of two 8-bit integers. As another example, the approximation could involve decreasing the number of bits used to represent the operands or outputs of the component computation. As another example, the data structure used to represent the operands could be simplified to lower resolution versions (e.g., from 8-bit floating point to 4-bit fixed point). The data structure format of the operands could be converted between all formats while being brought into data RAM on the processor core via direct memory access. The approximation could also simplify one or more of the operands to the computation while keeping other operands in their original format.

Figure 4:
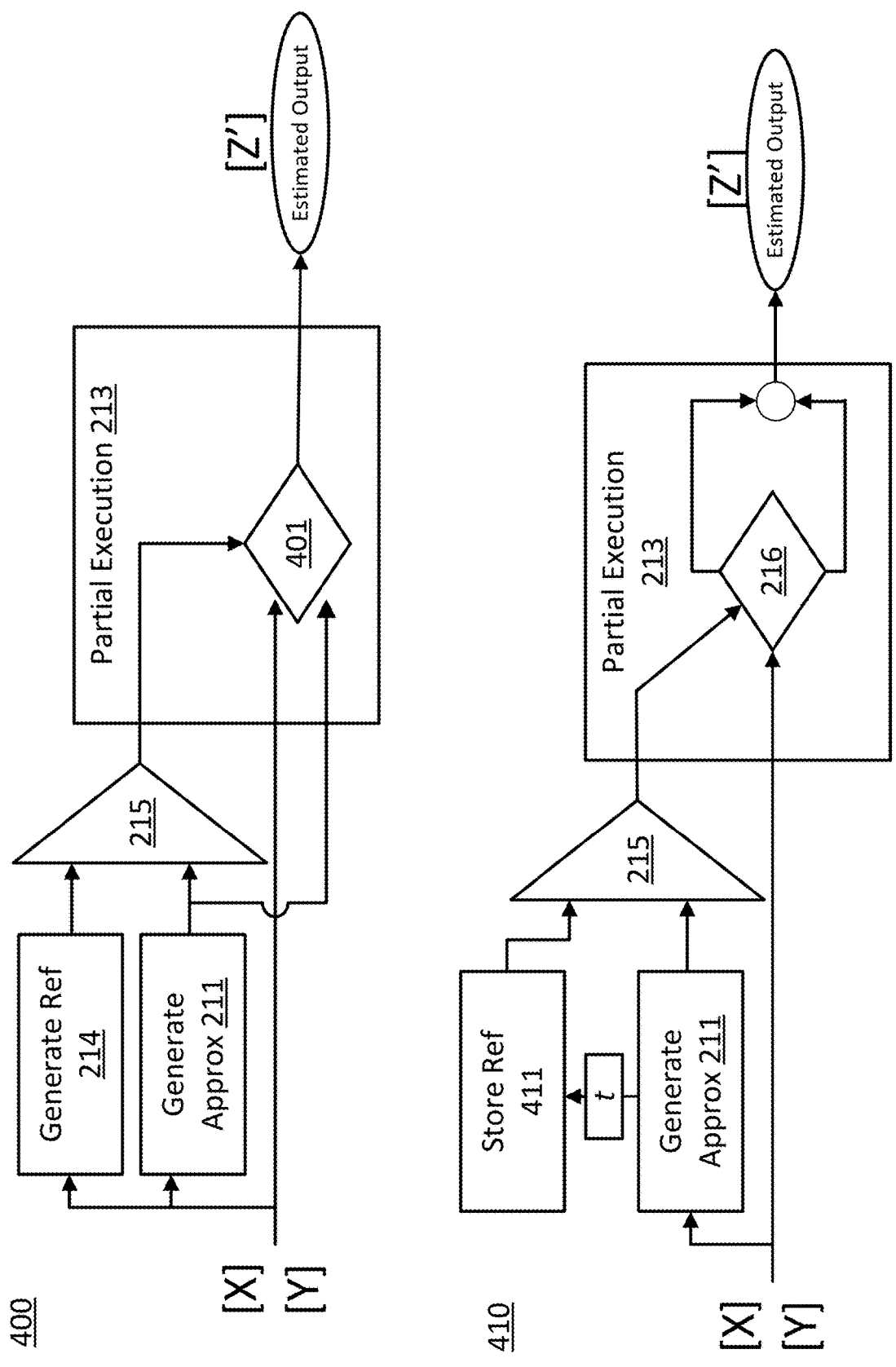
FIG. 4 illustrates a first data flow diagrams for generating an estimate output from a partial execution where a component contribution approximation is used in an arithmetic operation used to generate the estimated output, and a second data flow diagram where a previously generated component computation approximation is used as a reference value, both of which are in accordance with approaches disclosed herein.

FIG. 4 includes two data flow diagrams 400 and 410 that illustrate the generation of an estimated output for a composite computation. These data flow diagrams are specific examples of the classes of approaches described with reference to FIG. 2. In diagram 400, input tensors [X] and [Y] are subject to a partial execution 213. The partial execution can be used to estimate a dot product, filter convolution with input data, or other computation, the output of which is an output tensor [Z]. The tensors [X] and [Y] can be simple one-dimensional vectors or could alternatively be multi-dimensional and the computation could be any tensor computation including a convolution, dot product, or cross product.

Data flow diagram 400 includes many of the same steps as in data flow diagram 210 with similar operations identified using similar reference numbers. However, data flow diagram 400 is an explicit example of how the component computation approximation generated in step 211 can be used not only in evaluation step 215 but also can be used as part of partial execution 213. Specifically, if operation engine 401 receives a suppression command from evaluation step 215, then the component computation approximation generated in step 211 for the suppressed operation can be used to produce estimated output Z' instead of conducting the component computation. In the case of a sum-of-products computation, this would involve summing the value generated in step 211 with the accumulated total of the sum-of-products computation instead of multiplying the set of operands used in step 211 in a higher fidelity operation and summing the resulting value with the accumulated total of the sum-of-products computation.

Data flow diagram 410 includes many of the same steps as in data flow diagram 210 with similar operation identified using similar reference numbers. However, data flow diagram 410 is an explicit example of how the component computation approximations generated in step 211 can be stored as a reference 411 for a later execution of an evaluation step 215. As in prior diagrams, step 211 can involve generating an approximation for a component computation. The component computation 211 can then be used in an evaluation step 215 with a stored reference value to generate a command to either suppress or execute the corresponding computation in partial execution 213. In addition, the component computation generated in step 211 can also be stored in another iteration of step 411 to be used as a reference for the evaluation of a subsequent component computation.

Figure 5:
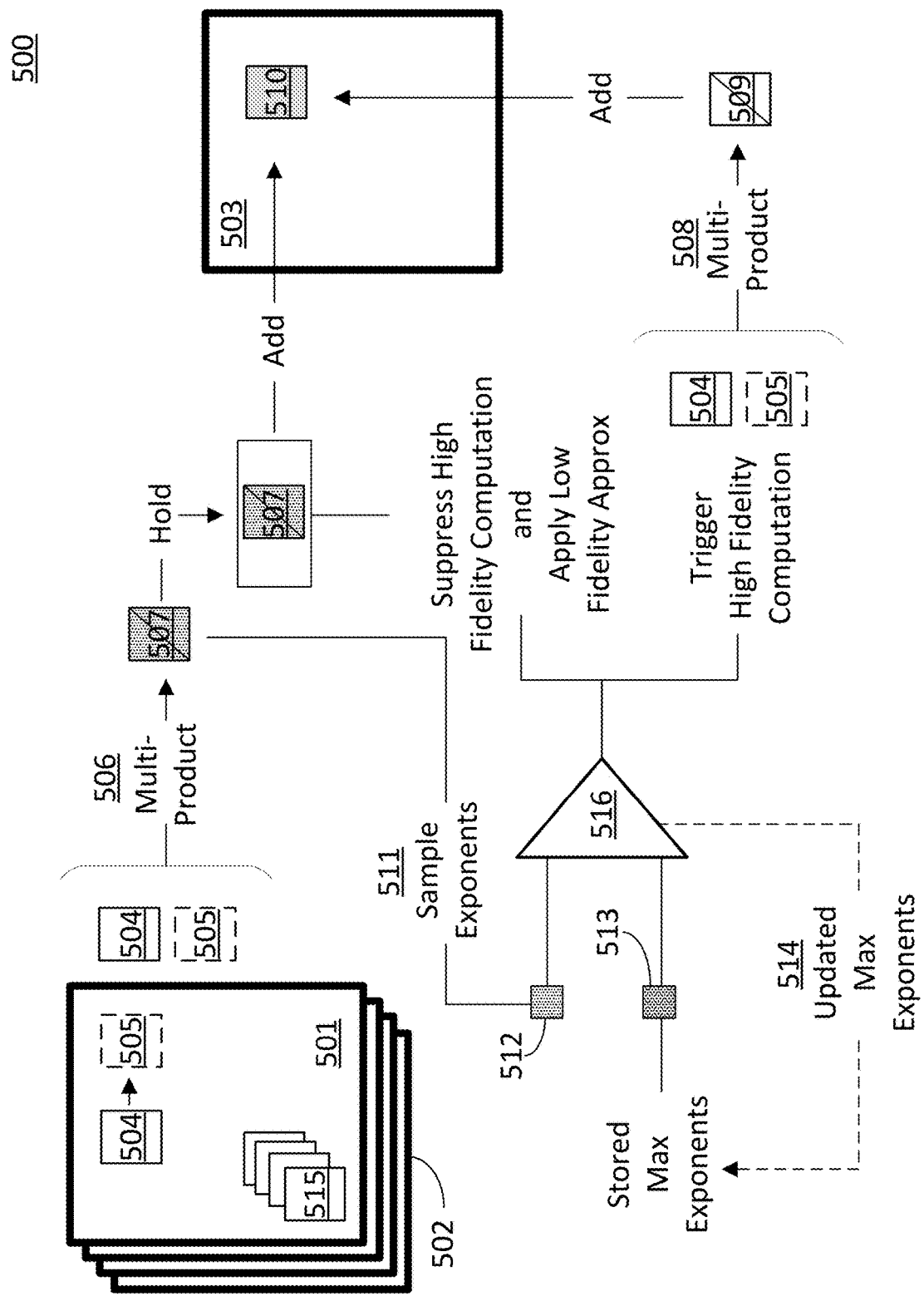
FIG. 5 illustrates the execution of a filter convolution computation in accordance with approaches disclosed herein in which both approaches from the two data flow diagrams of FIG. 4 are utilized in accordance with approaches disclosed herein.

FIG. 5 provides a data flow diagram of a combination of the approaches described above in which the composite computation is a multi-product computation between a filter and a set of input data, and the component computations are product computations between individual units of filter data and individual entries of input data. The multi-product computation can in turn be a component computation for a filter convolution computation in the execution of a convolutional layer of a neural network 500. The filter convolution computation can be conducted on a tile of input data. As illustrated, input data tile 502 is an n-dimensional tensor represented by a two-dimensional plane repeated in stacks. One two-dimensional plane in the stack is shown by layer 501. In the case of image data, the separate layers could be the red, green, and blue channels of a two-dimensional image. The convolution operation can involve an n-dimensional filter 515 that is "slid around" input data tile 502. The n-dimensional filter 515 can be broken into another stack of two-dimensional planes of which filter segment 504 represents one two-dimensional filter plane. Sliding the filters around the input data can involve multiplying each value in the filter with a corresponding value in the input data, saving the products in an output matrix with coordinates corresponding to that of the input data utilized in the operation, and moving the "location" of the filter relative to the input data. Once the filter has been placed in its new location, the operation can repeat. The step size, or "stride", of the filter can vary depending on application. Indeed there can be overlap with the prior location because the step size can be less than the filter size in the direction of movement. Each two-dimensional filter segment can be slid around a corresponding two-dimensional plane of the input data tile in this manner and the combined output data at each two-dimensional location can be summed to produce the output data. The resulting outputs will produce an output tensor. As illustrated, the output data tile 503 is a simple two-dimensional matrix.

In the language of this specification, the composite computation for FIG. 5 is the convolution between the filter 515, to which filter segment 504 belongs, and input data tile 502. There are numerous component computations involved given that this is a far more complex computation that a single sum-of-products computation. However, once such component computation that will be discussed below is the multi-product computation between a set of input data 505 from input data tile plane 501, and one filter segment 504 of filter 515. That component computation involves a subset of component computations in the form of product computations conducted with a filter entry from filter segment 504 and an entry from the set of input data 505.

The process of FIG. 5 beings with a low fidelity multi-product operation 506 involving the values from filter segment 504 and the set of input data 505. The low fidelity multi-product operation can generate many products according to a one-to-one correspondence between filter data entries and input data entries. As illustrated, the multi-product operation will generate a set of component computation approximation 507 that is a matrix of these values. The component computation approximations 507 can be used both to make the determination as to whether a corresponding higher fidelity computation should be conducted, and to substitute for the output of that higher fidelity computation if the higher fidelity computation is suppressed. The higher-fidelity computation can be a product operation in which each product involves a higher resolution product such as a 32-bit calculation in place of an 8-bit calculation. In the figure, either the stored component computation approximation 507 or the output 509 of high fidelity component computation 508, is applied to generate output data 510 in output data tile 503.

The decision on either suppressing the high-fidelity computation or executing the high-fidelity computation is conducted in step 516. The step can be conducted in accordance with step 215 and involves the evaluation of the component computation approximation 507 with a reference value. In the illustrated case, generating the reference value involves recalling information regarding a second component computation approximation that was previously obtained from another filter segment in filters 515. As such, generating the reference value can likewise involve generating those values to be recalled in the first place. The second filter segment will be a filter segment that was previously slid around a separate two-dimensional plane of input tile 502. Since the first filter segment in the set of filter segments will not be preceded by another filter segment from which reference values can be generated, the first filter segment in the set can utilize a preprogrammed set of values in place of the prestored reference values, or can simply be executed entirely in high fidelity while storing the information needed for a later execution of step 516 for another filter. The reference values can be generated by generating a second component computation approximation using a filter entry from a second filter segment and a corresponding entry from input data tile 502. The reference value is beneficially generated from a different filter segment operating on the same two-dimensional location on a different two-dimensional plane of input data tile 502 because making a determination to suppress or allow operations based on such a comparison will assure that only the filter segment and two-dimensional input data plane that created the strongest response for the output data will be executed in high fidelity while the others are not. This is beneficial and conducive to use in CNNs because certain filter segments and two-dimensional input data planes tend to evaluate input data for specific traits that may be mutually exclusive amongst the input planes. As such, input data can have a strong and important reaction expressed by the reaction of a plane of input data to a filter and have a nominal and negligible reaction to the filter on other input data planes.

The process of FIG. 5 also includes sampling the component computation approximations. In accordance with specific approaches disclosed herein, a set of component computation approximations can be sampled and the decision to execute the set of component computations that correspond with the set of component computations at higher fidelity can be based on an evaluation of the subset of sampled component computation approximations. In the illustrated case, the sampling involves sampling exponents 511 from the set of component computation approximation 507. In this approach, the entries in the set of component computation approximations are floating point numbers that are represented using an exponent value in memory. Step 511 can therefore include selecting a maximum exponent from a subset of the entries in the matrix such as the largest exponent out of every block of four entries in the set of component computation approximations 507. Different degrees of sampling are possible and involve a tradeoff between the overhead associated with running the comparison and the accuracy of suppression. The sampling procedure will then create a data structure with these sampled exponents 512 that is used to evaluate the set of component computation approximations 507. Depending upon the data type involved, other kinds of sampling are possible. In one approach, the entire value can be sampled and held for later comparison.

In order for a comparison step for making the decision on suppression or execution to function appropriately with a sampled version of the component computation approximations, the stored component computation approximations that will be used as reference values must also be sampled. In the illustrated case, this is somewhat trivial because step 516 continuously compares the stored exponents against a new set of exponents and controls the suppression of operations based on that determination. As a result, it inherently identifies which exponents in the new set 512 are larger than those in the stored set 513, and replaces the smaller with the larger in a process 514.

The set of sampled exponents 512 are compared with a stored set of sampled exponents 513. The stored set of sampled exponents are the maximum values sampled from a prior conditional computation of a different filter segment with the input data from a different input data plane located at the same two-dimensional location. During comparison step 516, whenever an exponent in set 512 is determined to be larger than a corresponding exponent in set 513, the component computation approximations from which that larger exponent were sampled will not be suppressed, and will be executed in a high-fidelity execution 508. In the illustrated case, this would mean that all four product computations from the set of product computations that the maximum exponent was sampled would be executed in high fidelity. Alternatively, if during the comparison step an exponent in set 512 is determined to be smaller or equal to a corresponding exponent in step 513, the component computations would be suppressed and the component computation approximations from which those values were derived would be output from memory and applied to the composite computation. In the illustrated case, this would involve a subset of values from which the exponent was sampled in component computation approximation set 507 being added to output data 510. Therefore, the same set of component computation approximations can either be fully or partially applied to the composite computation or discarded in place of higher fidelity computations that are not suppressed. In accordance with the illustration this would involve values from both set 507 and 509 being applied to produce output data 510.

The concepts described with reference to FIG. 5 can be modified to accommodate various kinds of composite computations. For example, a similar approach would apply if multiple filters were being applied to a single input data tile to produce an output data tile representing the sum total response of that input data tile to the multiple filters. In this variant, component computations involving the response of the input data tile to a single filter could be alternatively suppressed or fully executed based on a comparison to how the same portion of input data responded to another filter in the set of multiple filters. In the illustrated case, the stored maximum exponents 513, or other sampled value representing prior responses, would be the response of the same input data to a different filter than the one used to produce sampled maximum exponents 512. Other variants include changing the degree of sampling from one entry out of four to some other ratio such as one in five or one in twenty and having a variable level of suppression of the component computations based on the magnitude of difference between the stored and newly measured responses. For example, if a sampled value from the newly measured responses was ten times larger than the stored value, the entire set of component computations could be executed at high fidelity, while if a sampled value was only marginally larger than the stored value, only a closely associated subset of component computations could be executed at high fidelity.

Figure 6:
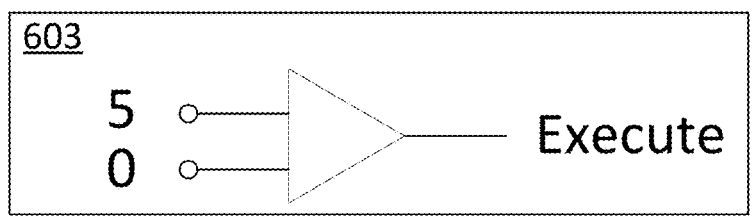
FIG. 6 illustrates the generation of a suppression command for a sum-of-products computation with a continuously updating reference value in accordance with approaches disclosed herein.
Figure 6:
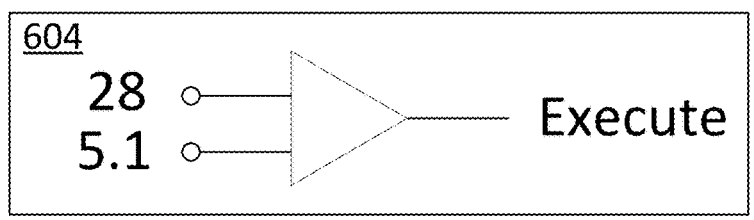
Figure 6:
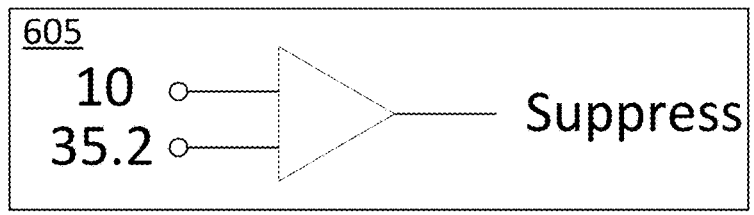

FIG. 6 provides a diagram 600 of another method for conducting step 215. The approach is a combination of the approach in FIG. 3 with the additional concept of a continuously updating reference value that is equal to the accumulated total of the sum-of-products computation as it executed. In diagram 600, two values from tensors [X] and [Y] are represented by floating point numbers. The step of generating component computation approximations 601 provides the example of rounded values being used to generate the products of two sets of values from the input tensors. Diagrams 603-605 show a component computation approximation from step 601 being compared with a current reference value. The generated reference values are calculated according to the equations under reference 606. In contrast to the approach of FIG. 3, all of the component computation approximations do not need to be generated in order for the reference value to be available. Instead, the component computations can be generated in real time with the overall partial execution of the composite computation. As seen in diagram 603, the first reference value is set to zero by default, and the first component computation approximation "5" is greater than this value which results in an "execute" command indicating that the higher fidelity computation should be executed. The first non-zero reference value generated under reference 606 is therefore 5.1×1 which is the current accumulated total of the sum-of-products computation after the first operation is executed. This process repeats with diagram 604 resulting in an "execute" command and another high-fidelity operation followed by a "suppress" command being generated in diagram 605. The approach can be augmented by adjusting the reference value with a programmable tolerance such that is more likely that computations towards the beginning of the composite are not executed. For example, the programmable tolerance can require component computation approximations to exceed 100% of the reference value when the component computations first start being executed and exceed 50% of the reference value when the final component computation is executed. The tolerance can be programmable to scale as required in any fashion through the course of executing a composite computation.

Figure 7:
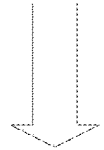
FIG. 7 illustrates the generation of a contribution estimate for a component computation involving floating point variables in accordance with approaches disclosed herein.
Figure 7:
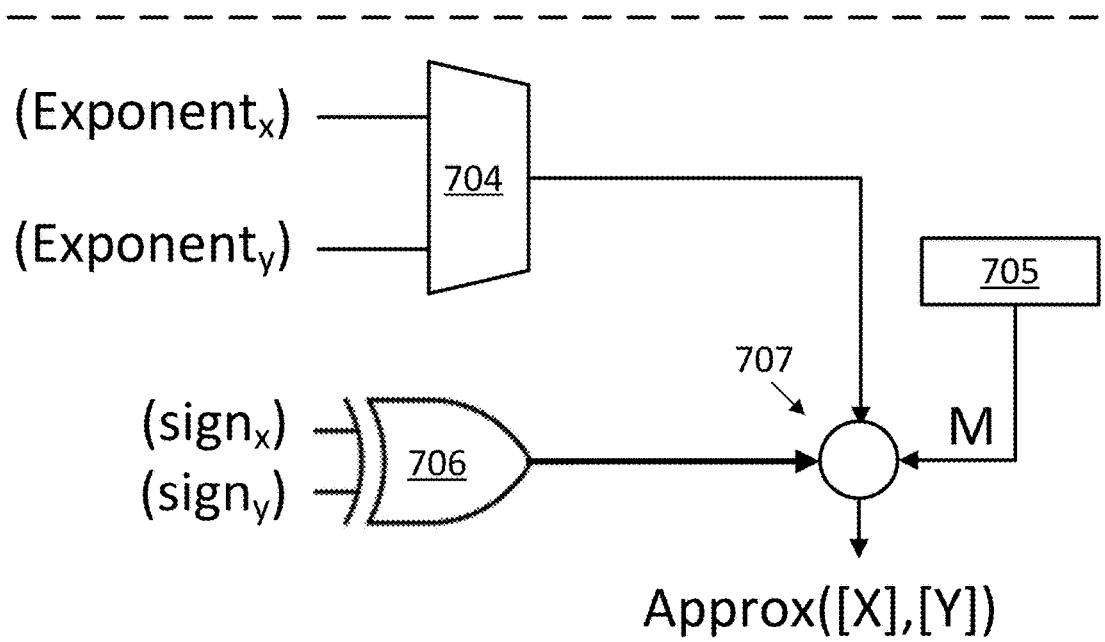

If the component computation is a multiplication computation between a first floating point input and a second floating point input, the component computation approximation could involve data flow diagram 700 in FIG. 7. In this example, two values from tensors [X] and [Y] are represented by floating point numbers 701 and 702. The floating point numbers are stored in memory as a sign, exponent, and mantissa in accordance with the illustrated format. The mantissa can be normalized to exist in the range of [1.0, 2.0) such that 2 is excluded but 1 is included. The exponent can be considered as representative of the coarse value of the number whereas the mantissa is for fine tuning. Dropping the mantissa to produce an estimate of the associated operand will result in a worst-case factor-of-two error range. Generally, assuming the operands in a system are evenly distributed, the average error would be a factor of 1.5 error range. In addition, multiplications in the exponent domain are equivalent to a straightforward addition of the exponents. Therefore, a component computation approximation for a multiplication of the values 701 and 702 can be provided by equation 703. In equation 703, M is a substitute value that is an approximation for the mantissas of the data elements from tensor [X] and [Y].

As illustrated, generating the component computation approximation in accordance with the approach of FIG. 7, includes adding an exponent of the first floating point input with an exponent of the second floating point input to generate an exponent sum, and multiplying the exponent sum by a mantissa estimate to generate an exponent-mantissa product. The mantissa used in that multiplication operation could be a fixed estimate or could be adjusted based on various factors. For example, the mantissa stand in could also be adjustable based on the inputs to the component computation approximation. In one particular class of approaches, the mantissa stand in will be generated along with the reference value for the composite computation during an analysis of the operands to the composite computation.

As an added benefit to the approach described in the previous paragraph, the implementation of equation 703 is cheap in terms of hardware and computational resource consumption. As seen in FIG. 7, the implementation only requires a low precision adder 704, for the exponents. The stand-in mantissa M can then be simply appended to the exponents. The adder is low precision because the exponents of a floating-point value are inherently represented by fewer bits that the floating-point value itself. For example, a 32b floating point value can have 8b exponents, a 16b floating point value can have 5b exponents, and custom floating point formats have less than 5b exponents. The adder is therefore "low" precision relative to a math unit operating on the entire fixed point variable. The exponent sum is generated by low precision adder 704. The mantissa can be appended to the exponents from a memory 705. The memory can be a register or ROM. The sign term can likewise be calculated by a single XOR operation requiring a single logic gate 706. In the illustrated case, processing unit 707 is a basic processing block that implements equation 703. The block multiplies inputs from low precision adder 704 and memory 705, and sets the sign of the output based on a binary input from single logic gate 706. The calculated values from either branch can be combined to represent the output of the component computation approximation for storage in a single register or other memory location. The resulting hardware can calculate a reasonably accurate component computation approximation with a fraction of the computational resources associated with the full execution of the multiplication of two floating point numbers.

If the component computation involved fixed point numbers, the component computation approximations could be generated using a related procedure. For example, hardware on the processing core could detect the number of leading zeros for the operands of the component computation. If the values were coded in binary, this would provide the highest power of two present in the number for both operands. The number derived by summing the leading zeroes of a known fixed point number type could then be treated as the "exponent" as in the prior example of FIG. 7. In this approach, the numbers derived by summing the leading zeroes of two or more operands would be summed to provide an approximation of the multiplication of the two fixed point numbers. The "exponent" would be derived using knowledge of the precision of the operand and the number of leading zeroes. One potential approach would set the approximation equal to: (total precision_operand_X−leading_zero_operand_X)+(total_precision_operand_Y−leading_zero_operand_Y).
The hardware involved with counting the leading zeros and conducting these additions and subtractions is notably less complex and resource hungry that the hardware required to multiply two fixed point numbers of any appreciable bit size.

The reference value can be generated and utilized in numerous ways. The reference value could be a preprogrammed value stored in memory independently of the operands for a given composite computation. Such an approach would utilize knowledge regarding the composite computations that are expected to be executed using the processing core, or the general effect of component computations having specific kinds of operands. For example, the reference value could be zero, one, or negative one. The reference value could alternatively be generated based on an evaluation of the operands to the composite computation, an evaluation of the component approximations, or an evaluation of the outputs of partial executions for other component computations in a given composite computation. The reference value also be generated after an analysis of the operands to a component computation, after the component computation approximations are generated, in combination with the generation of the component computation approximations, or in combination with the partial execution of the composite computation. As an example, the reference value could be set to a fraction of the largest component computation approximation calculated for a given composite computation, or the largest output of a partial execution for a suppressed component computation in the composite computation. In the case of a sum-of-products calculation, the reference value could be the largest component approximation for the component product computations. In such an approach, component product computations with corresponding component approximations less than a fraction of that reference value would be suppressed during a partial execution. The reference value could be continuously updated as additional approximations or partial execution outputs were generated for a given composite computation.

The manner in which the reference value is generated will affect the way it is utilized. For example, if the reference value was chosen to be the largest component computation approximation from a set of component computation approximations, the comparison used to determine which operations to suppress could be set to determine if the associated approximations were greater than a fraction of the reference value. In another example, if the reference value is chosen to be the average of the component computation approximations, the comparison used to determine which operations to suppress could be set to determine if the associated approximations were greater or less than the reference value. In certain situations, the comparison will utilize a programmable tolerance for these comparisons.

Figure 8:
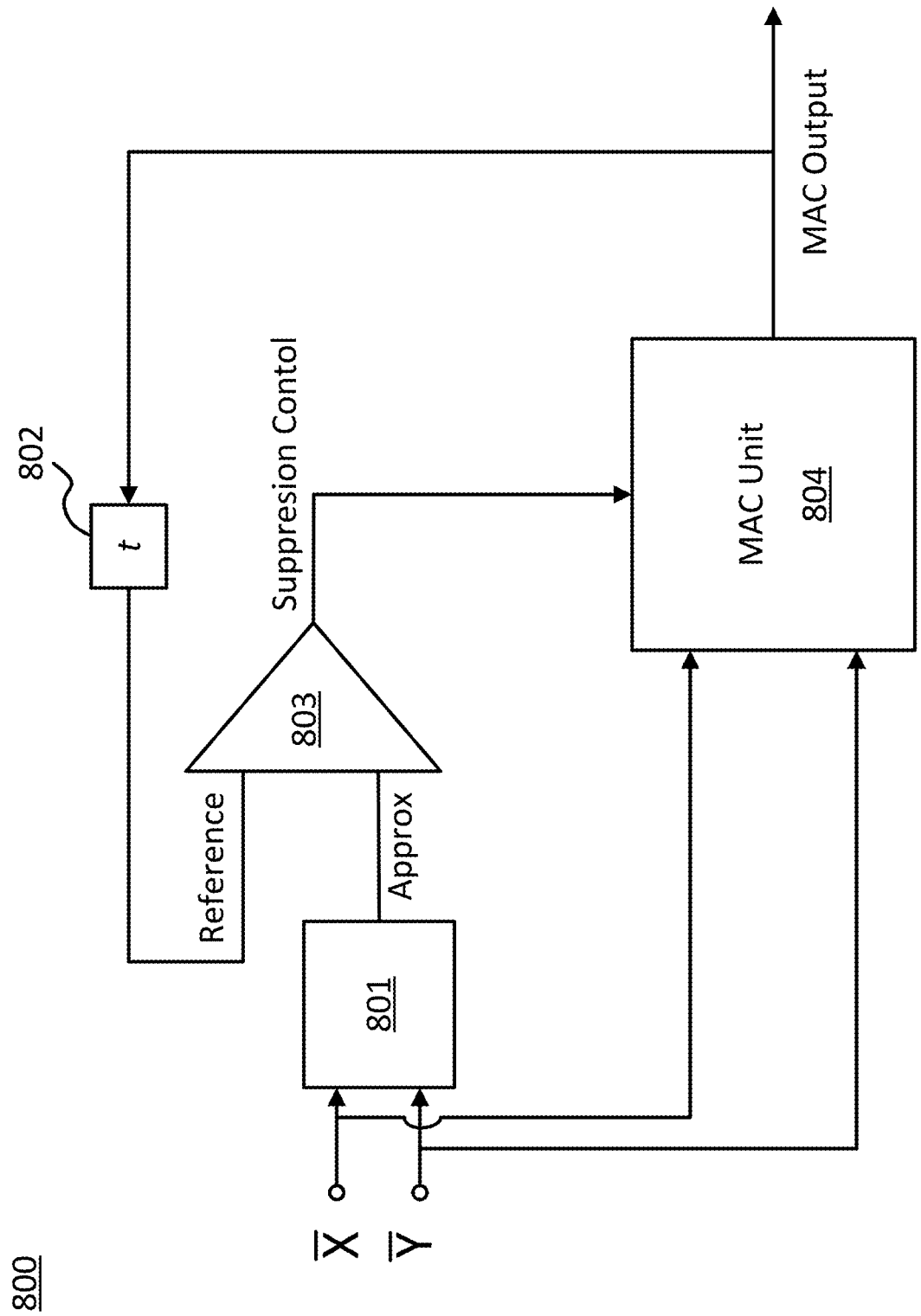
FIG. 8 illustrates the generation of a reference value used for selecting component computations from a composite computation for suppression in accordance with approaches disclosed herein.

FIG. 8 includes a data flow diagram 800 for a particular approach to generating the reference value. In this approach, the reference value is continuously updated as the partial execution is conducted. In data flow diagram 800, a partial execution of the sum-of-products calculation on the elements of two vectors X and Y is being conducted by a multiplication-accumulation unit (MAC) 804 and auxiliary circuitry used to suppress component computations and generate a reference value. Each set of values provided to MAC unit 804 are utilized in a component computation of the composite computation. MAC unit 804 multiplies the inputs it receives and adds it to the current accumulated value. The current accumulated value is provided on the output labeled MAC Output.

The values from vector X and Y are also provided to component computation approximation unit 801 which could determine an estimate of just the multiplication portion of what MAC unit 804 executed. This estimate would serve as the component computation approximation. Component computation approximation unit 801 could be a low bit multiplier, the circuitry from data flow diagram 700, or some other hardware used to generate an approximation of the multiplication of the values provided to MAC unit 804. For example, the computation approximation unit 801 could include conversion circuitry for altering the precision of the numbers from vector X and Y as they are pulled from RAM memory.

The approximation generated by unit 801 is then used in a comparison step conducted by comparison unit 803. This comparison unit could be similar to the one utilized in step 215 of flow diagram 200. However, the comparison in FIG. 8 is conducted using a reference value that is derived from the MAC Output. In effect, the current accumulated value is utilized as the reference value. The feedback path can include a clocked element 802 such that the system is kept in synchronization with the values provided form the input vectors. The comparison step generates a Suppression Control signal that instructs MAC unit 804 to alternatively suppress or fully execute component computations with the inputs from vectors X and Y.

In this example of FIG. 8, the reference value is continuously updated as the partial execution is executed. As such, a programmable tolerance utilized by comparison unit 803, can scale through the execution of the composite computation. For example, the programmable tolerance can increase by a factor of two after each component computation is executed or suppressed. The reference value can be initialized to a preprogrammed value, zero, the first approximation, or some other value. The approach in FIG. 8 is beneficial in that it provides a direct estimate of how much each component will contribute to the composite computation as the information regarding the output of the composite computation is generated.

The hardware utilized to suppress computations can take on different forms and will depend on the type of suppression utilized. As a basic example, a suppression scheme that pulled a value to replace the suppressed operation's output from memory may require space to store multiple replacement values for various suppressed operations in RAM memory, whereas a suppression scheme that utilized the approximation of the component computation as the replacement value could likely just provide that value from a set of registers. Specific examples of hardware that can implement various methods for suppressing operations disclosed herein are discussed below with reference to FIGS. 9-10.

Figure 9:
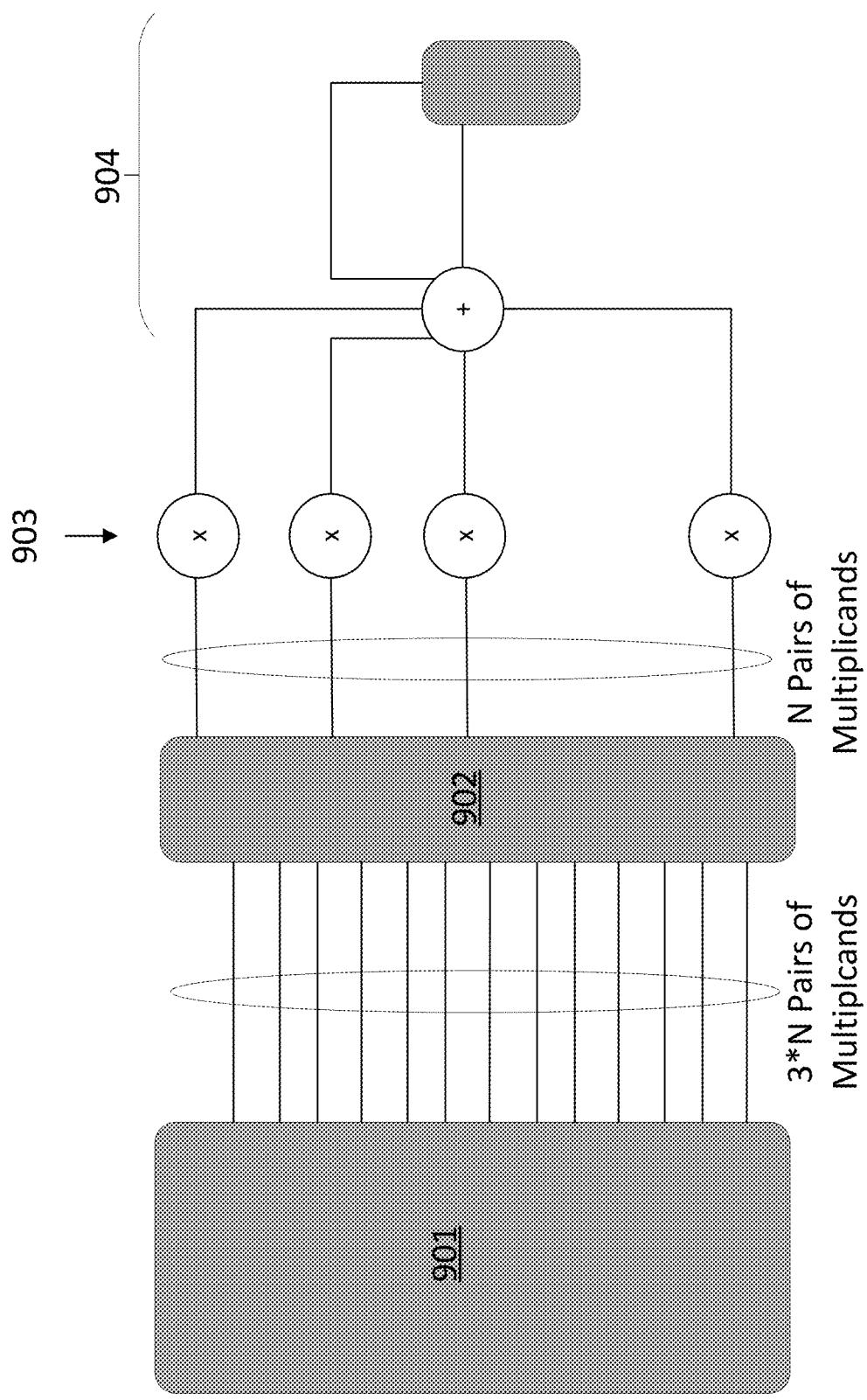
FIG. 9 is a block diagram of hardware elements on a processing core that suppress component computations from a composite computation by dropping them completely in accordance with approaches disclosed herein.

FIG. 9 includes block diagram 900 of a hardware implementation for a suppression scheme in which the suppressed component computations are simply dropped from the composite computation. FIG. 9 includes register file 901, suppression logic 902, multipliers 903, and accumulator 904. There are 3N pairs of operands stored in register file 901, 3N pairs of operand connections to suppression logic 902, and N pairs of operand connections to multipliers 903. In this example, the composite computation is a sum-of-products computation on the operands in the register file. In an approach in which operations were not going to be suppressed, and the sum-of-products computation was to be fully executed, suppression logic 902 could be removed. However, the diagram would also need to be augmented to include three times as many multipliers. Suppression logic is able to compute component computation approximations, prune out the computations that are not expected to have meaningfully contributions to the output (e.g., they have small magnitudes), and prevent the multiplicands associated with the less meaningful computations from being passed through suppression logic 902 to multipliers 903, thus achieving an effective tripling of multiplication throughput while expending much less than three times the computational resources in terms of both energy and silicon area.

In the example of FIG. 9, if suppression logic 902 is able to select two-thirds of the component computations to suppress, there will be the exact right number of operand pairs and multipliers, and all of the multiplicands needed for the partial execution will issue to the multipliers in a single clock cycle. Indeed, in certain approaches, the behavior of the suppression logic can be forced to cut a set number of component computations to assure that the ratio of suppressed operations to allowed operations matches the ratio set by available arithmetic or logic elements to sets of data elements in the register file. In the illustrated case, the suppression logic would force the suppression of the least important two-thirds of the component computations. However, suppression logic 902 could also operate over multiple clock cycles to assure that all component computations that rise to a certain degree of relevance are executed. For example, if suppression logic 902 only found that it could prudently suppress one-third of the component computations, then the processing core could still execute all of the component computations over two clock cycles. If suppression logic 902 found that even less component computations could be suppressed while maintaining a required degree of fidelity to a full execution, then a full three clock cycles would be required. However, even in this case power could be saved because unused multipliers on each clock cycle could be gated (e.g., by not clocking their input pipeline stages).

The gating in suppression logic 902 could involve multiplexers with data input lines communicatively coupled to the register file operand lines and data output lines communicatively coupled to the multiplier operand lines. The control inputs of the multiplexers could be connected to the circuitry that determines which computations should be suppressed. In certain approaches, the pairs of operands will have a limited number of multipliers to which they can be routed. As a result, suppression logic 902 cannot arbitrarily suppress any pattern of component computations while still executing the partial execution in the optimal number of clock cycles mentioned above (i.e., 1 clock cycle when ⅔ of the computations can be suppressed). In these approaches, the limitation on subsets of component computations that can be mutually suppressed in an efficient manner can be taken into account by suppression logic 902. For example, the relative importance of two component computations can be compared by analyzing their approximations relative to each other as well as relative to the reference value, and one of the two component computations can be suppressed even though it would not otherwise have been suppressed. The two comparisons, the one using the reference value and the other using the component computation, can be conducted in series or in parallel. If the comparisons are conducted in series, the second comparison (in which approximations are compared on a relative basis) can itself be suppressed if there are no conflicts between subsets of computations.

Figure 10:
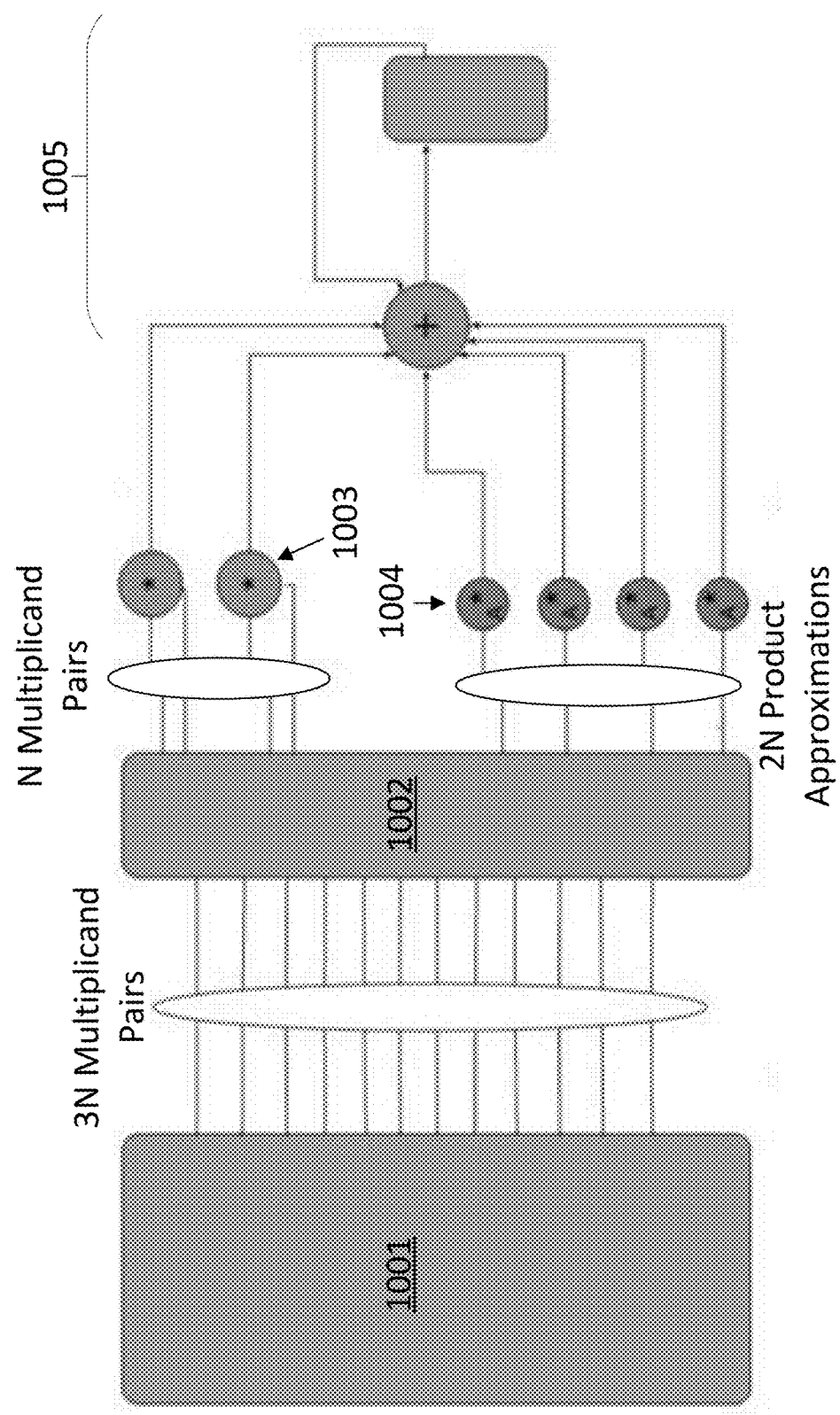
FIG. 10 is a block diagram of hardware elements on a processing core that suppress component computations from a composite computation by substituting them with partial component computations in accordance with approaches disclosed herein.

FIG. 10 is a block diagram 1000 of a hardware implementation for a suppression scheme in which the suppressed component computations are suppressed while providing a substitute value in place of the output of the suppressed computation. In this particular approach, the substituted values are the component computation approximations that were used to select which component computations should be executed and which should be suppressed. This is a nuanced point with important implications. FIG. 10 includes register file 1001, suppression logic 1002, multipliers 1003, approximation processors 1004, and accumulator 1005. There are 3N pairs of operands stored in register file 1001, 3N pairs of operand connections to suppression logic 1002, and N pairs of operand connections to multipliers 1003. In this example, the composite computation is a sum-of-products computation on the operands in the register file. These aspects of the hardware implementation are similar to the implementation in FIG. 9. FIG. 10 differs from FIG. 9 because block diagram 1000 includes a set of approximation processors 1004. Furthermore, suppression logic 1002 will differ from suppression logic 902 in that it will route the operands or approximations from the suppressed computations in addition to routing the operands for the higher priority computations.

The additional hardware and computational resources consumed by the higher logic burden placed on suppression logic 1002 and the circuitry used to generate the substituted values for the suppressed computations will still be less than that required to fully execute all of the component computations. As mentioned previously, substitute values for the suppressed component computations can be generated by lower precision multipliers or other hardware used to generate a substitute value for a component computation in a way that will consume fewer computational resources. These approaches would also require additional lines to output from the suppression logic. In the example of FIG. 10, the equivalent approach would require lines for 2N multiplicand pairs from suppression logic 1002 to approximation processors 1004 as opposed to 2N approximations.

In the illustrated case, approximation processors 1004 receive 2N component computation approximations from suppression logic 1002. In certain approaches, the component computation approximations were generated using 2N pairs of operands fed from register file 1001 to suppression logic 1002, and are associated with the set of 2N component computations that were selected for suppression by suppression logic 1002. The approximation processors can conduct basic processing on the component computation approximations such as changing their signs or, in the case of floating point numbers, annotating them with exponents. For example, the approximation processors could serve as processing unit 707 in FIG. 7. This approach is beneficial because, as personified by the circuitry associated with FIG. 7, the circuitry needed to generate the substitute values is cheaper than the circuitry used to implement a multiplier. Therefore, approaches such as FIG. 10 can achieve 3N perceived throughput with just slightly more than the computational resources for a machine with a throughput of N.

The actual values of three as a factor between the number of inputs and outputs to suppression logic 902 in FIGS. 9 and 1002 in FIG. 10 are for example only, and the concept expands to factors other than three. Also, although FIGS. 9 and 10 were limited to groups of two operands being provided to multipliers, the concept can be applied to any arithmetic or logic units, and approaches in which those unit each take in any number of operands. For example, the operand lines could carry three operands for a set of XOR gates in place of multipliers while still maintaining a three to one ratio between the operand lines into and out of the suppression logic. As another example, the operand lines into and out of the suppression logic could have a ratio of 4-7 for ANN applications, and far more than 7 for applications with very sparse data sets providing the operands for the composite computation.

The hardware utilized to generate reference values and control signals for the suppression logic can take on different forms and will depend on the specific form of suppression being utilized. For example, if the component computations are multiplications, and the suppression scheme generates approximations by screening for zero value operands, the hardware utilized to generate the component computation approximation could be a logical OR gate with inputs configured to receive the operands for the composite computation. In this example, the logical OR gate will output a zero if any of the operands to the multiplication are zero which also provides an accurate approximation for the output of a complete execution of the multiplication. As another example, if the component computations are two-operand multiplications, and the suppression scheme generates approximations by screening for operands with a value of 1 or −1, the hardware could be a comparator evaluating the operands and values stored in ROM or RAM that are equal to 1 or −1. In the case of an operand being identified as a 1, the suppression logic will be logic gates that substitute the output of the component computation for the alternative operand. In the care of an operand being identified as a −1, the suppression logic will be logic gates that substitute the output of the component computation for the alternative operand with its sign bit modified. Direct, independent, operand evaluation for purposes of determining a component computation approximation could also utilize a programmable tolerance such that operand values that were determined to be almost equal to 0, 1, or −1 were rounded to that value for purposes of controlling the suppression logic.

Figure 11:
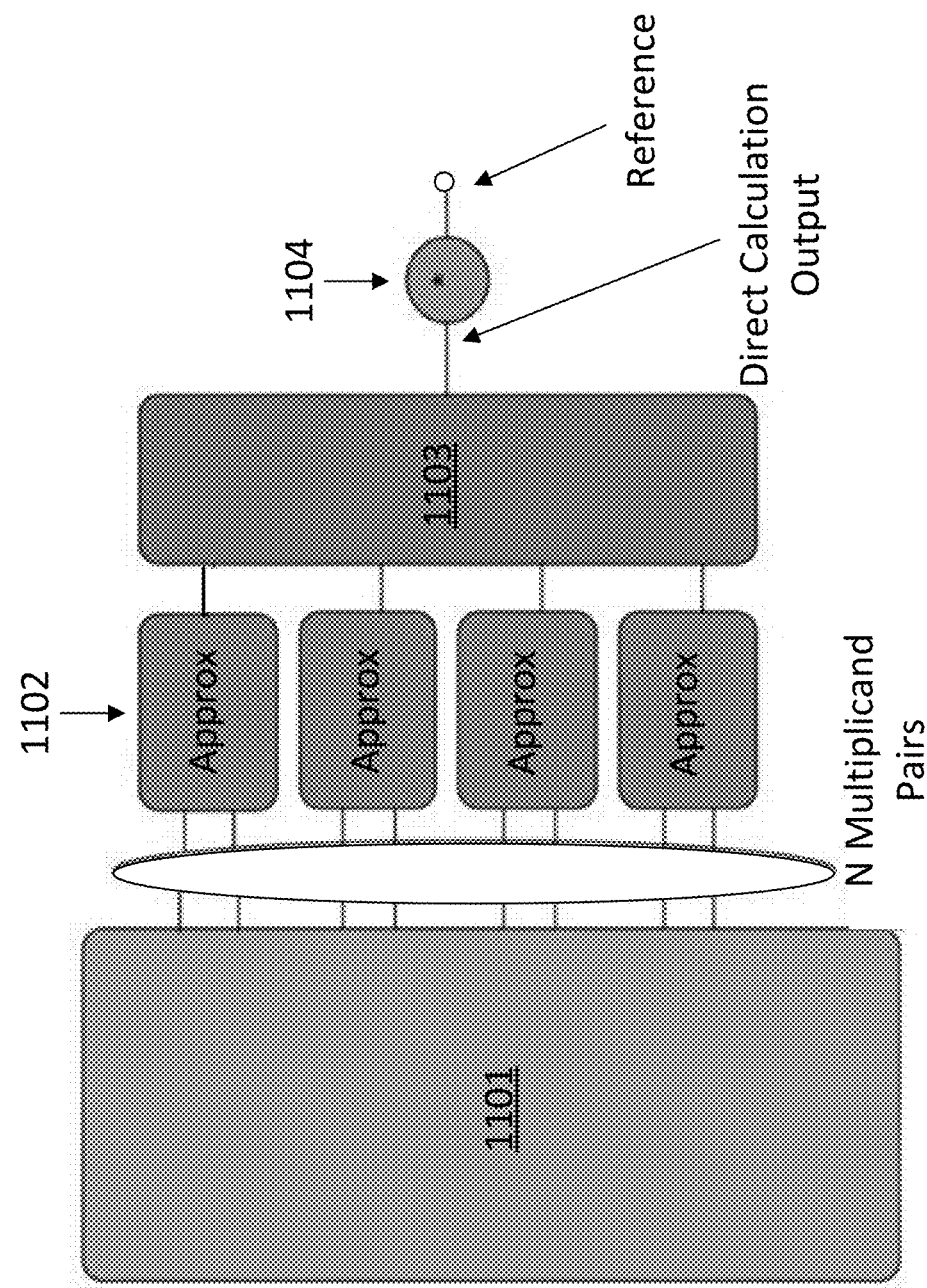
FIG. 11 is a block diagram of hardware elements on a processing core that generate a reference value for controlling the partial execution of a composite computation in accordance with approaches disclosed herein.

FIG. 11 is a block diagram 1100 of hardware elements on a processing core that generate a reference value for controlling the partial execution of a composite computation in accordance with approaches disclosed herein. Diagram 1100 again includes a register file 1101. The register file 1101 includes a set of lines delivering N pairs of multiplicands to a set of component computation approximation generators 1102. In this case, the component computations are multiplications and the approximation generators provide an approximation of the multiplication of their inputs without conducting a complete execution of the multiplication operation on those operands. The output of approximation generators 1102 is delivered to logic circuit 1103. Logic circuit 1103 can conduct various operations on its inputs. For example, logic circuit 1103 could select the largest value from its inputs, calculate a sum of its inputs, calculate an average of its inputs, or conduct some other operation to generate a useful reference value for controlling the partial execution. Logic circuit 1103 could then deliver its output to multiplier 1104. The multiplier could apply the programmable tolerance mentioned above to the output of logic circuit 1103 by multiplying the output of logic circuit 1103 with the programmable tolerance to generate a value equal to a fraction of the output of logic circuit 1103. For example, the programmable tolerance could be a negative power of two such that the fraction was one half, one fourth, one eight, or some other reciprocal of 2 to the X power. The output of multiplier 1104 could be used as the reference value for controlling partial execution.

Figure 12:
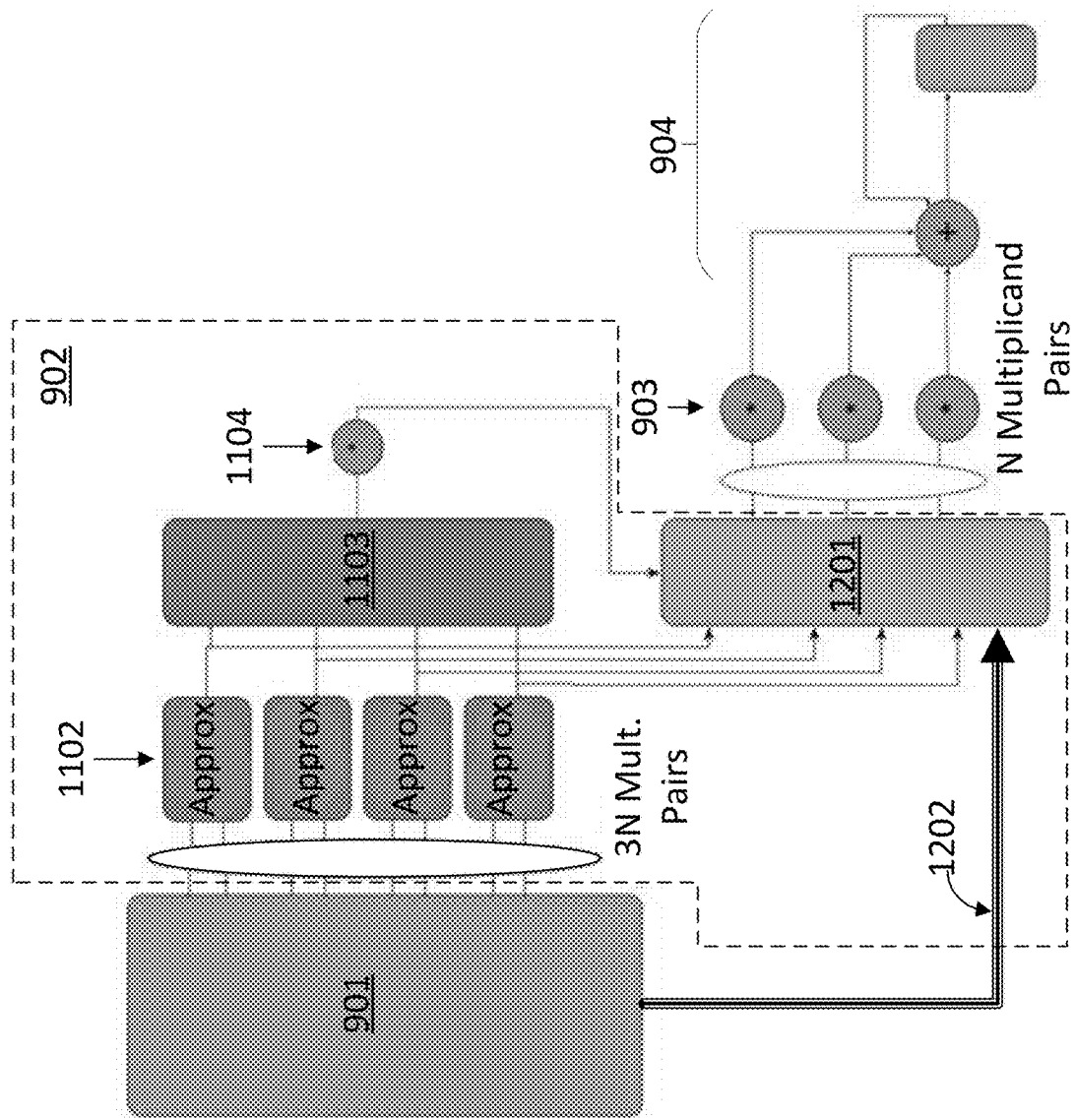
FIG. 12 is a block diagram of hardware elements on a processing core that utilizes component computation approximations to both generate a reference value and to compare with that reference value for purposes of selecting component computations to suppress.

FIG. 12 is a block diagram 1200 of hardware elements on a processing core that utilizes component computation approximations to both generate a reference value for controlling the partial composite computation, and to execute a comparison with that reference value in accordance with approaches disclosed herein. The illustrated block diagram of hardware elements could be utilized in place of suppression logic 902 in FIG. 9. In block diagram 1200, suppression sub-block 1201 could receive control signals in the form of both the reference value from multiplier 1104 and the component computation approximations from computation approximation generators 1102. The sub-block would then receive the original operands from register file 901, as illustrated by compound line 1202, and then inhibit a first subset of the set of operands from being passed through the suppression logic block while transmitting a second subset of the set of operands through the suppression logic block to multipliers 903, based on those control inputs. Numerous variations of this approach are available including substituting similar circuitry in place of suppression logic 902 and enabling suppression sub-block 1201 to pass computation approximations generated by computation approximation generators 1102 directly through to accumulator 904.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to sum-of-products calculations and convolutions, the same approaches could be utilized to simplify the execution of any composite calculation or composite logic operation. These and other modifications and variations to the present invention may be practiced by those skilled in the art, without departing from the scope of the present invention, which is more particularly set forth in the appended claims.

What is claimed is:

1. A computer-implemented method, wherein each step is executed by a processing core, comprising:
   generating a reference value for a composite computation, wherein a complete execution of the composite computation generates a precise output and requires execution of a set of component computations;
   generating a component computation approximation for a component computation in the set of component computations;
   evaluating the component computation approximation with the reference value;
   executing a partial execution of the composite computation to produce an estimated output; and
   suppressing the component computation, while executing the partial execution, based on the evaluation of the component computation approximation with the reference value.

2. The computer-implemented method of claim 1, further comprising:
   generating a second component computation approximation for a second component computation in the set of component computations;
   evaluating the second component computation approximation; and
   executing the second component computation, while executing the partial execution, conditionally based on the evaluation of the second component computation approximation.

3. The computer-implemented method of claim 1, wherein:
   the composite computation is a sum-of-products computation;
   the component computation is a product computation;
   the precise output requires execution of the set of component computations at a first resolution; and
   the component computation approximation is generated using a lower resolution execution of the product computation.

4. The computer-implemented method of claim 3, wherein generating the reference value includes:
   generating a set of component computation approximations for a subset of the set of component computations; and
   summing the set of component computation approximations to generate a sum.

5. The computer-implemented method of claim 1, wherein:
   the composite computation is a multi-product computation between a set of input data and a first filter segment from a first filter; and
   the component computation is a product computation conducted with: (i) a filter entry from the first filter segment; and (ii) an entry from the set of input data.

6. The computer-implemented method of claim 5, wherein generating the reference value includes:
   generating a second component computation approximation using the set of input data.

7. The computer-implemented method of claim 6, wherein:
   generating the reference value includes selecting a maximum exponent of the second component computation approximation;
   evaluating the component computation approximation with the reference value includes comparing a maximum exponent of the component computation approximation with the maximum exponent of the second component computation approximation; and
   suppressing the component computation when the maximum exponent of the component computation approximation is smaller than the maximum exponent of the second component computation approximation.

8. The computer-implemented method of claim 1, further comprising:
   comparing the component computation approximation to the reference value; and
   wherein the generating the reference value step uses a programmable tolerance.

9. The computer-implemented method of claim 1, wherein:
   the method consumes a first amount of computational resources;
   the complete execution of the composite computation consumes a second amount of computational resources; and
   the first amount is less than the second amount.

10. The computer-implemented method of claim 1, wherein:
    the composite computation is a sum-of-products computation; and
    the set of component computations includes a set of product computations.

11. The computer-implemented method of claim 10, wherein:
    the component computation is a multiplication computation with a first floating point input and a second floating point input; and
    the generating of the component computation approximation step includes adding an exponent of the first floating point input with an exponent of the second floating point input to generate an exponent sum.

12. The computer-implemented method of claim 11, wherein:
    the exponent sum is generated by an adder; and
    the adder has less than 9-bit precision.

13. The computer-implemented method of claim 10, wherein generating the reference value for the composite computation comprises:
    continuously updating the reference value while executing the partial execution using a current accumulated value of the sum-of-products computation and a scaling percentage of the current accumulated value; and
    wherein the scaling percentage increases as the partial execution is conducted.

14. The computer-implemented method of claim 1, wherein generating the reference value for the composite computation comprises:

generating a set of component computation approximations;
selecting a largest component computation approximation in the set of component computation approximations; and
wherein the reference value is a fraction of the largest component computation approximation.

15. The computer-implemented method of claim 1, wherein generating the reference value for the composite computation comprises:
generating a set of component computation approximations;
summing the set of component computation approximations to generate a sum; and
wherein the reference value is a fraction of the sum.

16. The computer-implemented method of claim 1, wherein:
a set of operands for the composite computation are located in a register file;
the suppressing of the component computation step is conducted by a suppression logic block; and
the suppressing of the component computation step includes:
inhibiting a first subset of the set of operands from being passed through the suppression logic block; and
transmitting a second subset of the set of operands through the suppression logic block.

17. A computer-implemented method, wherein each step is executed by a processing core, comprising:
storing a reference value for a composite computation in a memory, wherein a complete execution of the composite computation generates a precise output and requires execution of a set of component computations;
generating a component computation approximation for a component computation in the set of component computations;
evaluating the component computation approximation with the reference value;
executing a partial execution of the composite computation to produce an estimated output; and
suppressing the component computation, while executing the partial execution, based on the evaluation of the component computation approximation with the reference value.

18. The computer-implemented method of claim 17, wherein:
the composite computation is a sum-of-products computation;
the component computation is a product computation;
the precise output requires execution of the set of component computations at a first resolution;
the component computation approximation is a lower resolution product computation output generated using a lower resolution execution of the product computation; and
the partial execution of the composite computation uses the component computation approximation by summing the lower resolution product computation output in the sum-of-products computation.

19. The computer-implemented method of claim 17, further comprising:
the composite computation is a sum-of-products computation; and
generating the reference value for the composite computation comprises:
continuously updating the reference value while executing the partial execution using a current accumulated value of the sum-of-products computation and a scaling percentage of the current accumulated value; and
wherein the scaling percentage increases as the partial execution is conducted.

20. The computer-implemented method of claim 17, wherein:
the memory is a ROM memory.

21. The computer-implemented method of claim 17, wherein:
generating the component computation approximation for the component computation in the set of component computations comprises evaluating a set of operands to the component computation to determine if any of the operands in the set of operands are highly influential to the component computation; and
suppressing the component computation comprises obtaining a replacement value from memory.

22. A computer-implemented method, wherein each step is executed by a processing core, comprising:
storing at least one reference value for a composite computation, wherein a complete execution of the composite computation includes a set of component computations;
generating a set of component computation approximations for the set of component computations;
executing a partial execution of the composite computation to produce an estimated output, wherein the partial execution of the composite computation uses the set of component computation approximations; and
alternatively suppressing and executing the component computations in the set of component computations, while executing the partial execution, based on the at least one reference value and the set of component computation approximations.

23. The computer-implemented method of claim 22, wherein:
the composite computation is a sum-of-products computation;
the set of component computations is a set of product computations; and
when a component computation is suppressed a corresponding component computation approximation is applied to execute the partial execution.

24. The computer-implemented method of claim 22, wherein:
generating the set of component computation approximations includes evaluating a set of exponents of a set of operands used in the set of component computations.

25. The computer-implemented method of claim 22, wherein:
generating the set of component computation approximations includes evaluating a number of leading zeros of a set of operands used in the set of component computations.

* * * * *